(12) United States Patent
Peterson

(10) Patent No.: US 7,071,826 B2
(45) Date of Patent: Jul. 4, 2006

(54) METHOD AND DEVICES WITH A CIRCUIT FOR CARRYING INFORMATION ON A HOST

(75) Inventor: Dean Peterson, Sylmar, CA (US)

(73) Assignee: Precision Dynamics Corporation, San Fernando, CA (US)

( * ) Notice: Subject to any disclaimer, the term of this patent is extended or adjusted under 35 U.S.C. 154(b) by 419 days.

(21) Appl. No.: 10/251,556

(22) Filed: Sep. 19, 2002

(65) Prior Publication Data

US 2004/0056769 A1    Mar. 25, 2004

(51) Int. Cl.
*G08B 13/14* (2006.01)

(52) U.S. Cl. .............................. 340/572.8; 340/572.1; 156/60

(58) Field of Classification Search ................ 283/75, 283/109; 340/557.8, 568.2, 572.1, 572.3, 340/572.4, 572.5, 572.6, 572.7, 572.9, 572.8, 340/572.2; 235/492; 361/600; 156/60
See application file for complete search history.

(56) References Cited

U.S. PATENT DOCUMENTS

| | | | | |
|---|---|---|---|---|
| 5,312,136 A | * | 5/1994 | Capozzola | 283/75 |
| 5,653,472 A | * | 8/1997 | Huddleston et al. | 283/75 |
| 5,933,993 A | * | 8/1999 | Riley | 40/633 |
| 5,973,600 A | * | 10/1999 | Mosher, Jr. | 340/572.8 |
| 6,206,292 B1 | * | 3/2001 | Robertz et al. | 235/488 |
| 6,404,341 B1 | * | 6/2002 | Reid | 340/572.8 |
| 6,836,215 B1 | * | 12/2004 | Laurash et al. | 340/572.1 |

* cited by examiner

*Primary Examiner*—Anh V. La
(74) *Attorney, Agent, or Firm*—Kelly Lowry & Kelley, LLP

(57) ABSTRACT

A band for carrying information including a first band section having a bottom side, a first bonding layer disposed over a significant portion of the bottom side and a circuit, configured to carry information, bonded to the bottom of the first band section. The bonding layer may use adhesive or thermal bonds. The band also includes a second band section having a top side and a bottom side, where the top side is bonded to the bottom side of the first band section such that a continuous portion of the first and second band sections are bonded around the entire circuit. The band further includes a second adhesive layer disposed over a significant portion of the bottom side of the second band section and a release section having a top side, the top side bonded to the bottom side of the second band section.

63 Claims, 9 Drawing Sheets

METHOD AND DEVICES WITH A CIRCUIT FOR CARRYING INFORMATION ON A HOST

FIELD OF THE INVENTION

The field of the invention relates generally to methods and devices for carrying information on a host and more particularly, to a band with a circuit encapsulated within, the circuit configured to carry information.

BACKGROUND INFORMATION

Efficient and reliable methods and devices for attaching individualized information to a host is a valuable asset in countless environments. Concerts, sporting events and hospitals are just a few examples of environments that require a degree of control over people greater than that found in everyday life. Farms, public display events and animal shelters demonstrate how this need can extend to animals as well. No matter what type of host is present, however, these environments are ubiquitous.

Devices which can carry individualized information on a host typically take the form of a flexible band that is attached to a host with little risk of detachment. A good example of this is the identification (ID) band. ID bands are typically extended over and around a person's hand, head, or foot, and fastened to prevent removal. The ID band permits individualized information to be attached to a person, either by color or a printed or hand-written label. For instance, amusement park attendees with a lower degree of admittance privileges might wear an ID band of one color, while attendees with a higher degree of permitted admittance might wear a different color, thus allowing park operators to manage admittance in an efficient manner. Another example might be a hospital, where each patient wears a band with a label that carries the patient's vital characteristics such as their name, blood type, etc. Hospital administrators can accurately and efficiently identify patients who may be incapacitated or otherwise unable to speak.

ID bands are typically affixed to the hand or foot by the use of a closure device such as a snap or an adhesive. The construction of the ID band will vary according to the type of closure device used. Multiple ID bands are generally manufactured in a single strip that can be stored on a spool. The spool can be fed through a printer to print a label on each band, and then each band can be separated and attached to the host.

Because of a need to track hosts, or to provide increased information, such as medical history of a host, there is a need for ID bands to include electronic circuits. Accordingly, there is also a need for a good manufacturing process of ID bands having circuits.

SUMMARY

An example embodiment of an improved band for carrying information includes a first band section having a bottom side, a first bonding layer disposed over a significant portion of the bottom side of the first band section, and a circuit, configured to carry information, which is bonded to the bottom side of the first band section. The bonding layer may be an adhesive layer or thermally bonded region between two layers. The example band also includes a second band section having a top side and a bottom side, the top side bonded to the bottom side of the first band section such that a continuous portion of the first and second band sections are bonded around the entire circuit. The second band section also includes a second adhesive layer disposed over a significant portion of the bottom side of the second band section and a release section having a top side, the top side bonded to the bottom side of the second band section.

When the band for carrying information is manufactured according to an example manufacturing process, the first layer of adhesive is disposed over a significant portion of the bottom side of the first and second band sections. The top side of the release section is bonded to the bottom side of the second band section. The circuit, which is configured to carry information, is then bonded to the bottom side of the first band section. Then, the top side of the second band section is bonded to the bottom side of the first band section such that the bond between the first and second band sections encapsulates the entire circuit.

If the band uses a thermal bond instead of adhesive, the top side of the second band section is thermally bonded to the bottom side of the first band section in order to encapsulate the circuit.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The details of the invention, both as to its structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION

The improved band has a circuit configured to carry electronic information. The circuit is preferably encapsulated within the band so that the circuit is protected from undesirable environmental elements such as liquids or dust. Any variety or amount of information can be written to and read from the circuit. The band can be attached to a host and can provide information to an end-user regarding the host in a quick and efficient manner. This provides a high degree of flexibility to any end-user that needs to associate individualized information to a host.

Figure 1A:
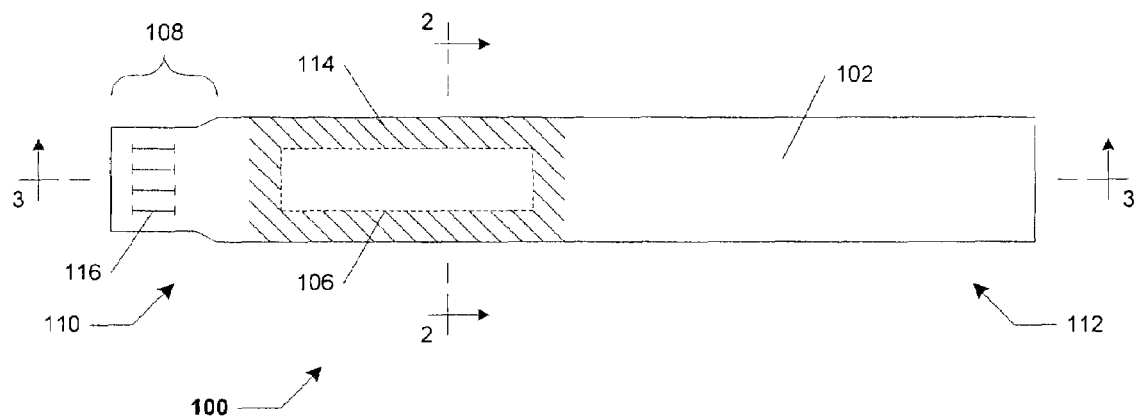
FIG. 1A is a top down view depicting an example band having a circuit.

FIG. 1A depicts a top down view of one embodiment of an ID band having a circuit. In this embodiment, band 100 includes first band section 102, first end 110 and second end 112.

Figure 1B:
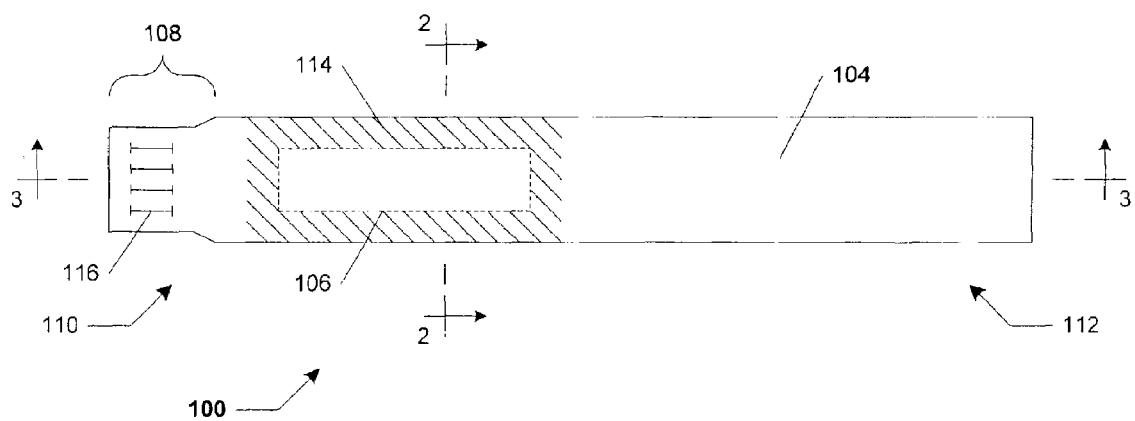
FIG. 1B is a bottom up view depicting an example band having a circuit.

FIG. 1B depicts a bottom up view of band 100, including second band section 104, first end 110 and second end 112. First end 110 and second end 112 can be coupled together with closure portion 108 to affix band 100 onto a host. As previously mentioned, the host can be a person, an animal, or an object. Band 100 can be affixed to any appendage of a host such as a wrist, ankle, neck, arm, or head. For instance, band 100 can be configured as a bracelet, anklet, or necklace. Circuit 106 is depicted with a dashed line to indicate that it is encapsulated within band 100, between first band section 102 and second band section 104. The circuit can be any kind of circuit including, for example, radio frequency identification (RFID) circuits, Bluetooth circuits, Global Positioning System circuits, memories, processors, etc. The circuit can be made of any kind of materials, including organic materials and/or inorganic materials. To encapsulate circuit 106, preferably a continuous portion of first band section 102 and second band section 104 are bonded together around circuit 106. This continuous portion is indicated by shaded region 114.

By encapsulating circuit 106, sections 102 and 104 protect circuit 106 from undesirable environmental elements. Liquids and moisture are examples of environmental elements that can be potentially harmful to circuit 106. Accordingly, sections 102 and 104 are preferably composed of a liquid-resistant material, such as plastic or rubber, which inhibits the entry of liquids or moisture. In one embodiment, sections 102 and 104 are composed of polypropylene. When sections 102 and 104 are bonded together, they provide a liquid-resistant encapsulation around the entire circuit 106. This is desirable because it prevents the threat of short circuits that can occur when electronic circuits are exposed to moisture. Liquids such as sweat and salt water are especially harmful because of the salt content that can corrode circuit 106 as well. In addition to protection from exposure to liquids, the encapsulation of circuit 106 also protects against other harmful environmental elements such as dust, physical shock and direct sunlight.

Figure 2:
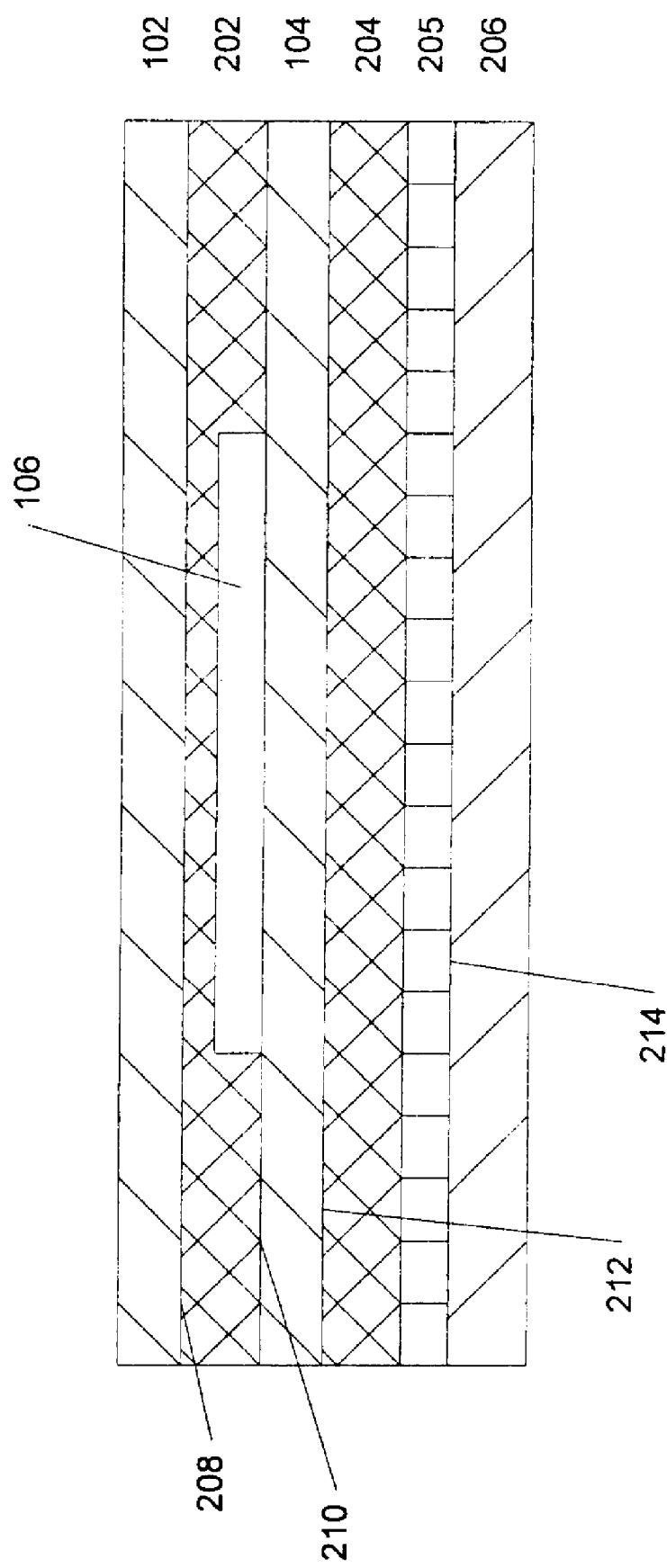
FIG. 2 is a cross-sectional view depicting an example band having a circuit.

FIG. 2 depicts a cross-sectional view of one embodiment of band 100, the cross-section taken along line 2 shown in FIGS. 1A and 1B. In this embodiment, band 100 includes first band section 102, adhesive layer 202, second band section 104, adhesive layer 204, bond-resistant layer 205 and release section 206. One that is skilled in the art will readily recognize that the thicknesses of the various sections and layers have been greatly exaggerated for purposes of clarity. Further, each layer does not have to have its relative thickness as illustrated, as each may have a thickness appropriate for the specific application.

Adhesive layer 202 is disposed over a significant portion of bottom side 208 of first band section 102. Adhesive layer 202 bonds first band section 102 to both circuit 106 and top side 210 of second band section 104. Adhesive layer 202 can be disposed over any area of bottom side 208 so long as sufficient adhesive is in place to bond circuit 106 and second band section 104 to first band section 102. The strength of the bond and the amount of adhesive disposed in adhesive layer 202 can vary according to the type of adhesive used and the application or environment where band 100 is implemented.

Adhesive layer 202 is also preferably disposed over continuous portion 114 of bottom side 208. Continuous portion 114 can vary according to the size and shape of band 100 and circuit 106, so long as the area where first band section 102 is bonded to second band section 104 preferably surrounds the entire circuit 106. By surrounding circuit 106, first band section 102 and second band section 104 encapsulate and protect circuit 106. The greater the width of continuous portion 114, i.e. the greater the size of the bonded area between circuit 106 and the edge of band 100, the stronger the encapsulation of circuit 106 will be, therefore providing more protection to circuit 106. Therefore, the significant portion of bottom side 208, where adhesive layer 202 is disposed, is preferably large enough to bond sections 102 and 104 together as well as encapsulate circuit 106.

Adhesive layer 202 preferably provides a liquid-resistant bond that will not erode when exposed to liquid or moisture in the environment. In one embodiment, first band section 102, second band section 104 and the bond provided by adhesive layer 202 are all liquid-resistant and provide a liquid-resistant encapsulation of circuit 106.

All of the embodiments described in this specification may use a thermal bond between sections instead of an adhesive layer. Thus, for example, in the above embodiment, the top side of the second band section would be thermally bonded to the bottom side of the first band section in order to encapsulate the circuit. The term "bonding layer" shall include both adhesive layers and thermally bonded layers.

Preferably, the bonded area between first band section 102 and second band section 104 is sufficiently strong to prevent tampering with band 100 and may include, as an option, tamper-evident means. In an embodiment where band 100 is implemented as an ID band, the end-user may require that the information carried by band 100 is reliable and free from compromise. Therefore, the prevention of tampering is important in serving this end. By peeling apart sections 102 and 104, for instance, one could remove and replace circuit 106 with another circuit 106 carrying different or modified information. If there is no visual indication of this, the ability of band 100 to reliably carry information can be defeated. Alternatively or optionally, the operability of circuit 106 may be disabled upon tampering.

Adhesive layer 202, or the thermal bond, is preferably strong enough so that any tampering will cause visual indications such as tearing, ripping or stretching of band 100. In one embodiment, end 110 is configured to indicate tampering with die cuts. FIG. 1A depicts die cuts 116 that are placed on closure portion 108. After band 100 is affixed, if an attempt is made to remove band 100 by releasing closure portion 108, die cuts 116 will cause band 100 to tear. The torn portion of band 100 can then provide visual indication of tampering.

Figure 3:
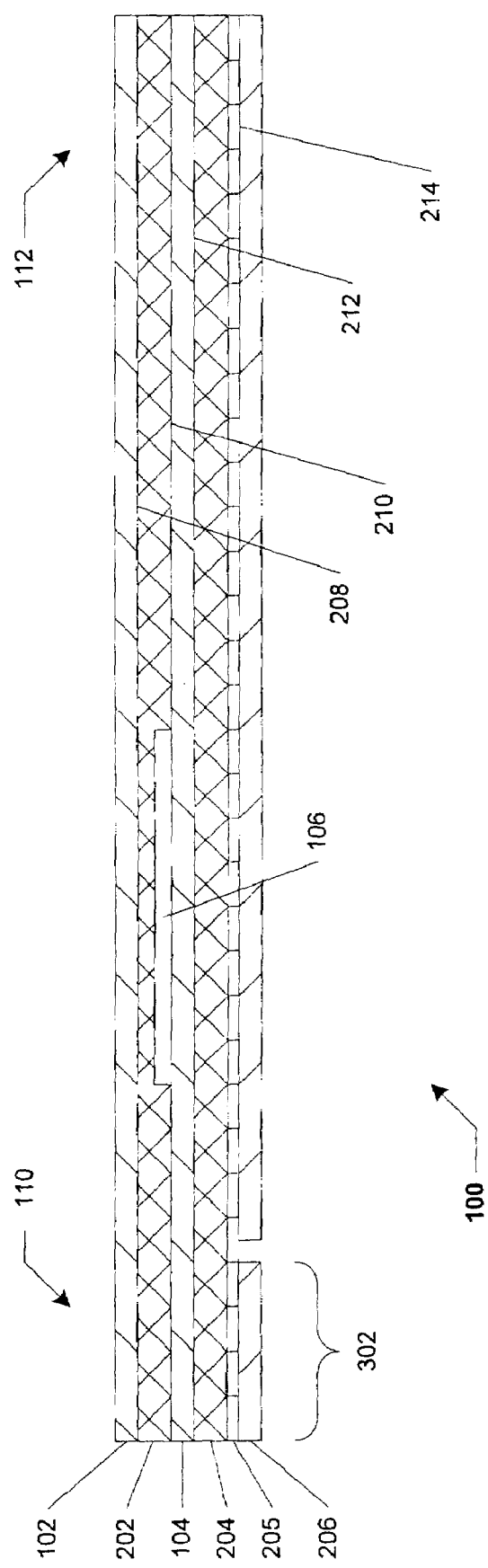
FIG. 3 is a cross-sectional view depicting an example band having a circuit.

FIG. 3 depicts a cross-sectional view of one embodiment of band 100 taken along line 3 shown in FIGS. 1A and 1B. In this embodiment, second adhesive layer 204 is disposed over bottom side 212 of second band section 104. Top side 214 of release section 206 is bonded to bottom side 212 of second band section 104. Release section 206 is cut near end 110 to provide for releasable portion 302. Releasable portion 302 of release section 206 can be removed from band 100 to expose adhesive layer 205 underneath. Preferably, adhesive layer 205 is pressure sensitive, so that end 110 can be bonded to another surface simply by applying pressure. To affix band 100 onto a host, releasable portion 302 is removed and band 100 is wrapped around an appendage of a host. End 110 is bonded to end 112 by bringing the exposed adhesive layer 204 at end 110 into contact with end 112 and applying pressure.

To facilitate the removal of release portion 302, top side 214 of release section 206 can be coated with an optional bond-resistant layer 205. Compared to release section 206 itself, bond-resistant layer 205 is less capable of forming adhesive or cohesive bonds with adhesive layer 204. In one embodiment, bond-resistant layer 205 is a silicone-based material. The bond-resistant properties of bond-resistant layer 205 make the removal of release section 206, including release portion 302, easier to perform. Bond-resistant layer 205 can be disposed over any area of top side 214, according to the level of adhesiveness or cohesiveness desired. In one embodiment, bond-resistant layer 205 is disposed over release portion 302 alone. In another embodiment, bond-resistant layer 205 is disposed over the entire release section 206.

Figure 4:
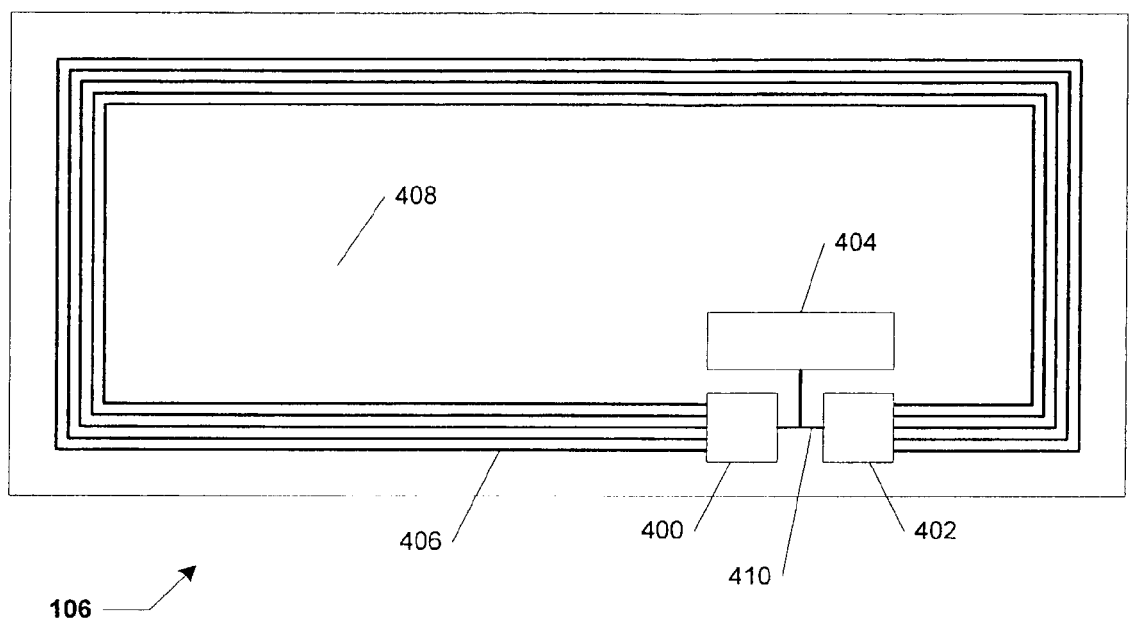
FIG. 4 is a schematic diagram depicting an example circuit having a circuit.

FIG. 4 depicts an embodiment of circuit 106 that may be embedded into an ID band. In this embodiment, circuit 106 is a radio frequency (RF) circuit and includes transmitter 400, receiver 402, memory 404 and antenna 406. Circuit 106 is coupled to substrate 408, which provides physical support to circuit 106 and prevents transmitter 400, receiver 402, memory 404 and antenna 406 from moving laterally with respect to one another. In one embodiment, circuit 106 is adhesively bonded to substrate 408 and in another embodiment circuit 106 is coupled to substrate 408 by way of a laminate cover. Substrate 408 is flexible and allows band 100 to twist and bend without damaging circuit 106. Preferably, circuit 106 is bonded to one side of substrate 408 and the opposite side of substrate 408 is bonded to bottom side 208 of first band section 102.

Transmitter 400 and receiver 402 are configured to send information and receive information, respectively, using one or more radio frequencies. Memory 404 is communicatively coupled to transmitter 400 and receiver 402 by interface 410. Memory 404 is configured to store information and can be readable, writeable or both. Transmitter 400 and receiver 402 are communicatively coupled to antenna 406 that is configured to operate over one or more radio frequencies. In this embodiment, circuit 106 is self-energizable. A device attempting to read or write to circuit 106 will supply energy to circuit 106 and, accordingly, circuit 106 requires no power supply.

Band 100 preferably maintains a substantially uniform thickness when circuit 106 is encapsulated within it. The degree of uniformity is dependent upon the amount of circuitry included in circuit 106 as well as the thickness of the individual circuit elements. Certain wireless applications may require greater signal range or signal strength, in which case larger, more powerful circuitry may be required, thereby creating a smaller degree of uniformity in thickness. However, many applications may only require circuit 106 to be very thin, creating a high degree of uniformity in thickness over band 100.

Circuit 106, or any of its components, can be composed of organic or inorganic materials, or any combination of the two. Circuit 106 is also not limited to operation using radio frequencies. Other embodiments of circuit 106 include any circuit that operates using infra-red, optical, magnetic and/or wireline methods of communication. Of course, any known circuits may be part of circuit 106, such as those needed for Bluetooth or Global Positioning Satelite functions.

Circuit 106 can be written to and read from at any time, including while encapsulated within band 100. In one embodiment, multiple bands 100 are fabricated on a spool which can then be fed through an electronic read/write (R/W) device. Each band 100 is fed through the R/W device, where information can be read from or written to circuit 106. After information is written to an individual band 100, it can be separated from the spool and affixed to a host. In this manner, a large variety and amount of individualized electronic information can be placed on band 100 and then affixed to the appropriate host. In one example setting, such as a hospital, each incoming patient's name, blood type, allergies, etc. are written to band 100 and then band 100 is affixed to the patient's wrist. A device configured to read the information from circuit 106, or a reader, can then be used to read the information from band 100 whenever the end-user desires.

Band 100 can also be configured to carry an image on the top surface of section 102. In one embodiment, band 100 is coated with a thermal imaging surface such as a Ricoh 120LCS surface. When band 100 is passed through a thermal printer, heat applied by the printer can modify the thermal imaging surface and generate an image on band 100. Any image can be written on the band, including, but not limited to textual labels, images and bar codes. In one embodiment, the R/W device is also configured with thermal printing capability, allowing electronic information and images to be written using the same device.

Figure 5:
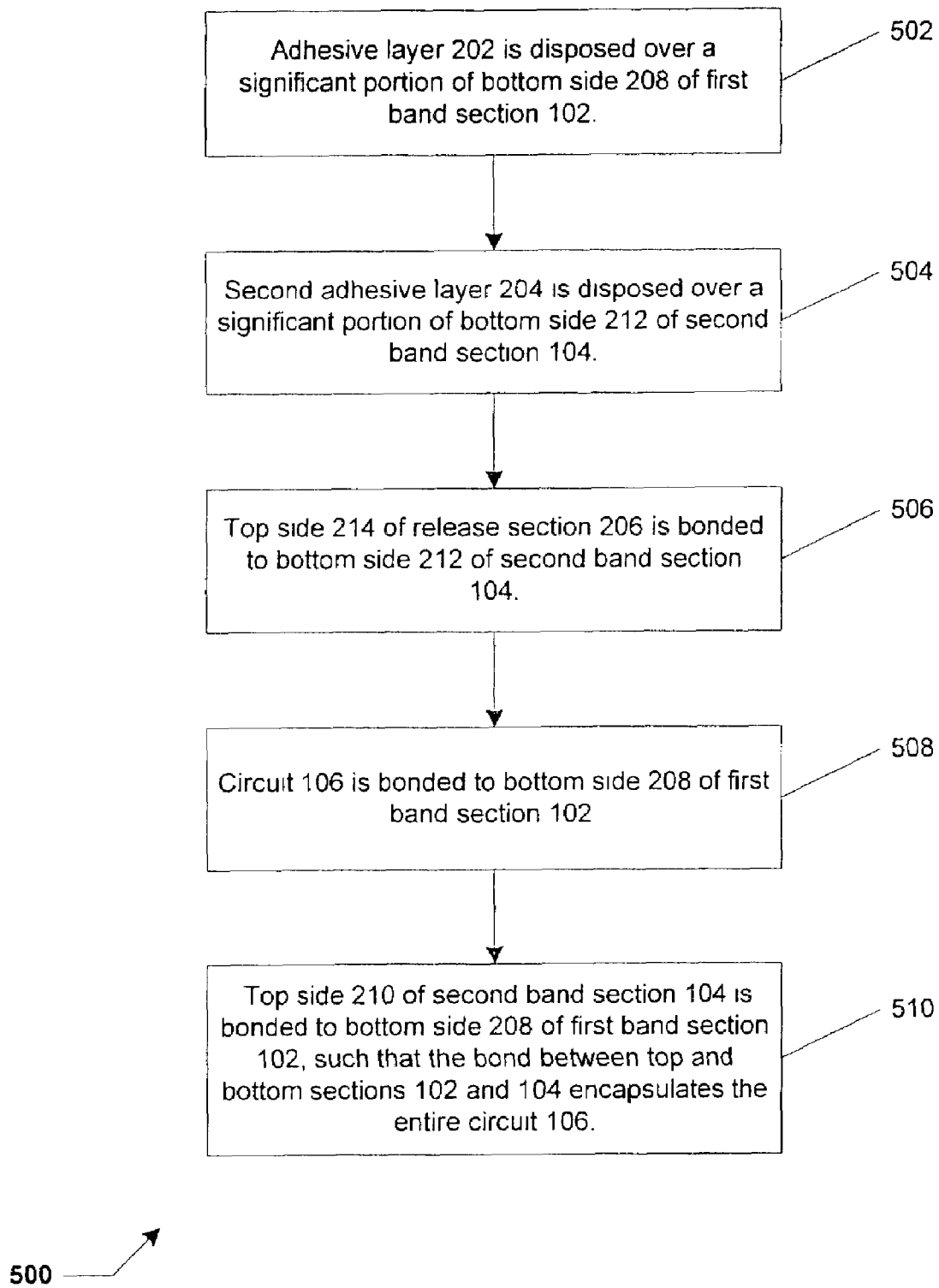
FIG. 5 is a flow diagram depicting an example embodiment of a method of manufacturing of an ID band having a circuit.

FIG. 5 depicts an example embodiment of a method 500 of manufacturing band 100. At 502, adhesive layer 202 is disposed over a significant portion of bottom side 208 of first band section 102. Next, at 504, second adhesive layer 204 is disposed over a significant portion of bottom side 212 of second band section 104. Then, at 506, top side 214 of release section 206 is bonded to bottom side 212 of second band section 104. At 508, circuit 106 is bonded to bottom side 208 of first band section 102. At 510, top side 210 of second band section 104 is bonded to bottom side 208 of first band section 102, such that the bond between top and bottom sections 102 and 104 encapsulates the entire circuit 106.

Figure 6:
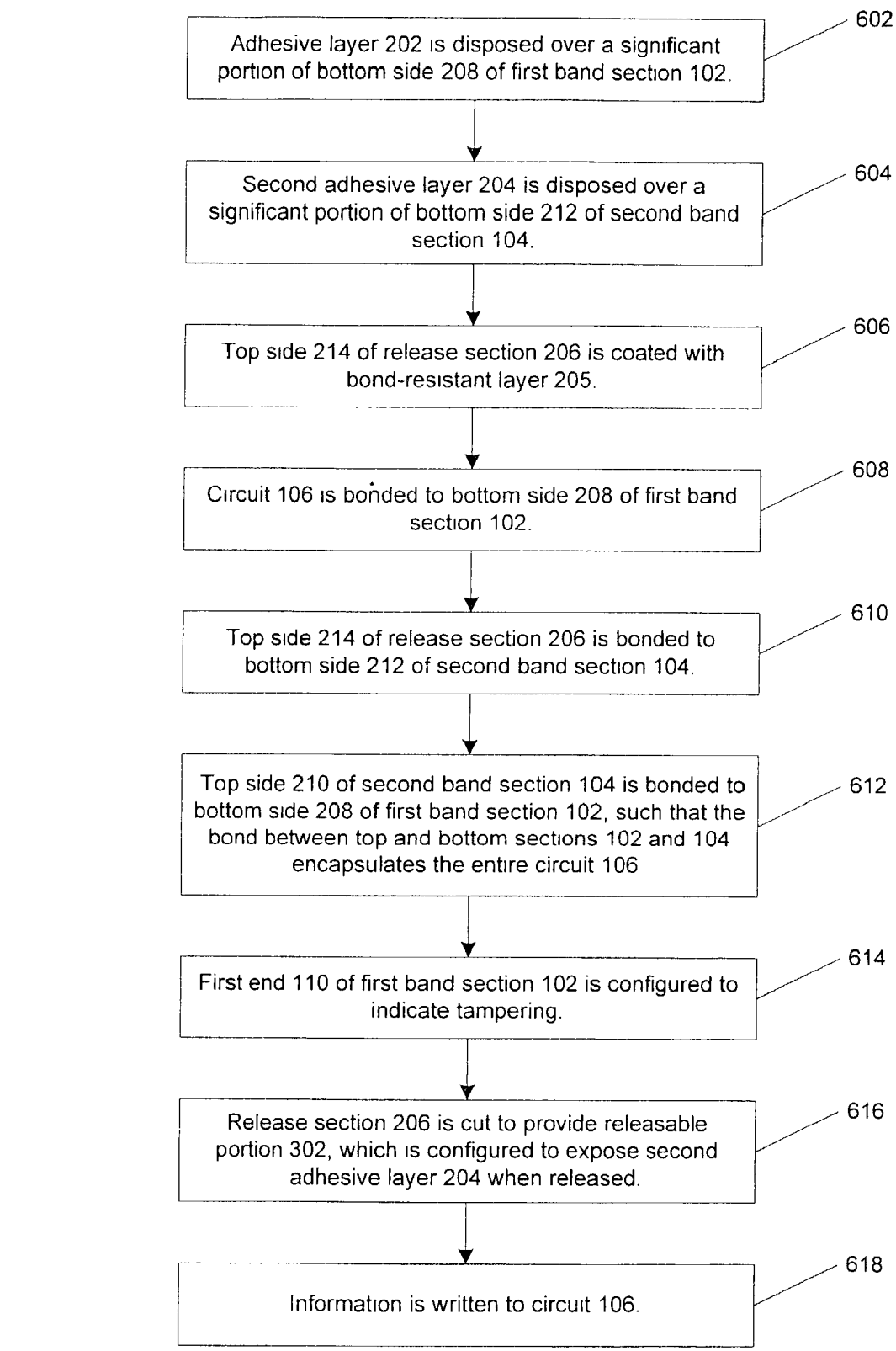
FIG. 6 is a schematic diagram depicting another example embodiment of a method of manufacturing of an ID band having a circuit.

FIG. 6 depicts method 600, which is another embodiment of a method of manufacturing band 100. At 602, adhesive layer 202 is disposed over a significant portion of bottom side 208 of first band section 102. Next, at 604, second adhesive layer 204 is disposed over a significant portion of bottom side 212 of second band section 104. Then, at 606, top side 214 of release section 206 is coated with bond-resistant layer 205. At 608, circuit 106 is bonded to bottom side 208 of first band section 102. Next, at 610, top side 214 of release section 206 is bonded to bottom side 212 of second band section 104. Then, at 612, top side 210 of second band section 104 is bonded to bottom side 208 of first band section 102, such that the bond between top and bottom sections 102 and 104 encapsulates the entire circuit 106. At 614, first end 110 of first band section 102 is configured to indicate tampering and, at 616, release section 206 is cut to provide releasable portion 302, which is configured to expose second adhesive layer 204 when released. At 618, information is written to circuit 106.

Figure 7:
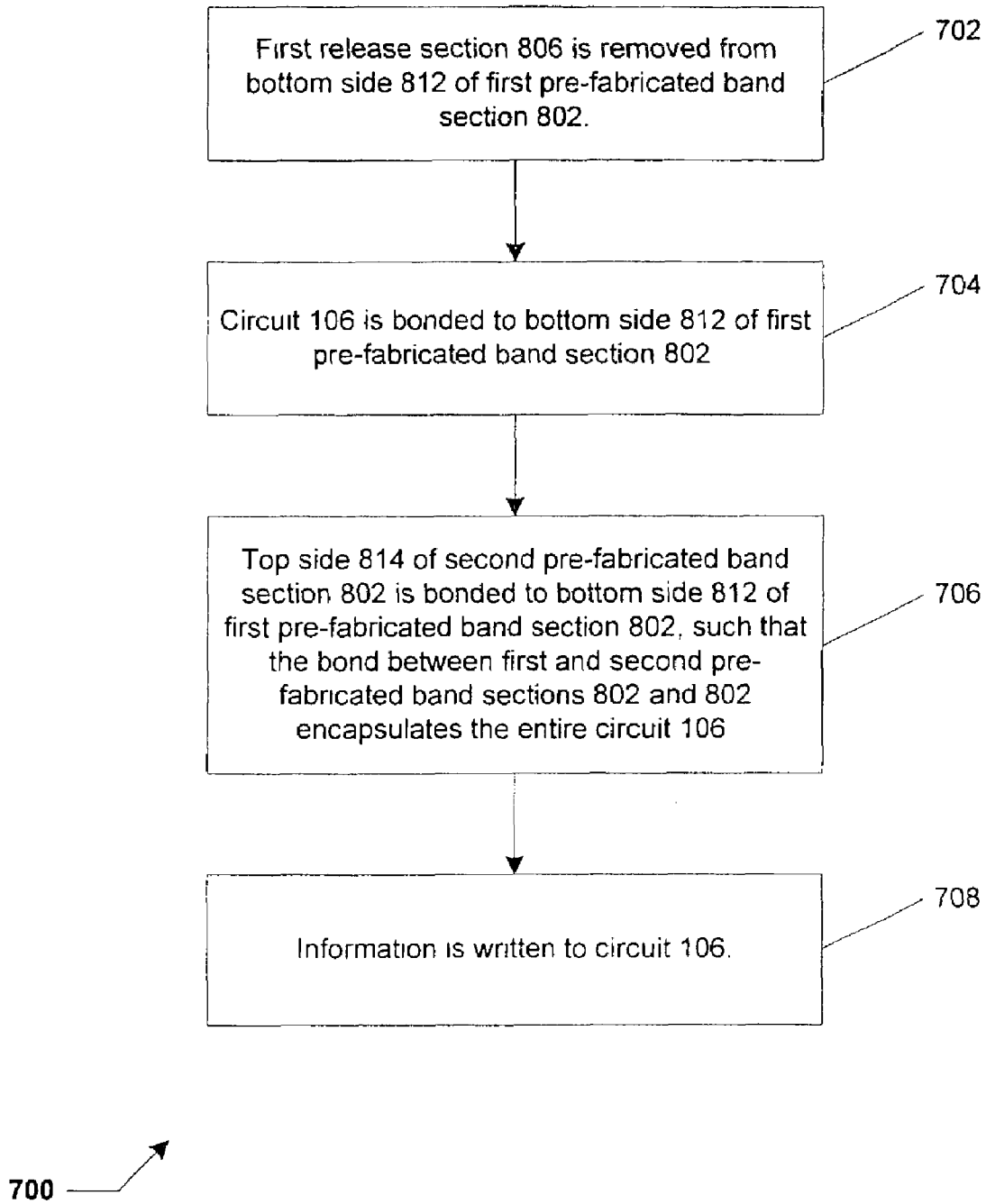
FIG. 7 is a schematic diagram depicting yet another example embodiment of a method of manufacturing of an ID band having a circuit.
Figure 8A:
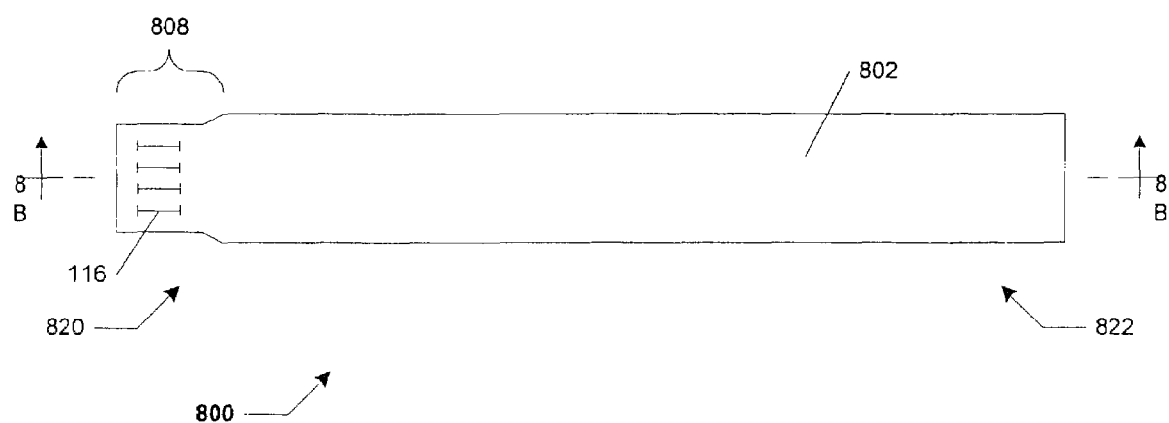
FIG. 8A is a top down view depicting an example pre-fabricated band.
Figure 8B:
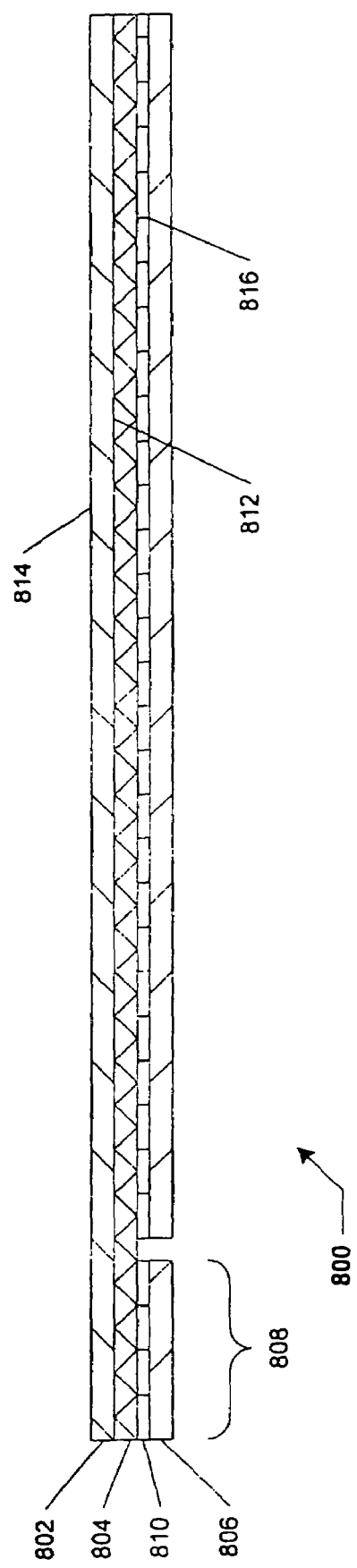
FIG. 8B is a cross-sectional view depicting an example pre-fabricated band.

FIG. 7 depicts method 700, which is yet another embodiment of a method of manufacturing band 100. In this embodiment, method 700 uses two pre-fabricated bands 800 to manufacture band 100. FIG. 8A depicts a top down view of one embodiment of pre-fabricated band 800. Here, pre-fabricated band 800 includes pre-fabricated band section 802, first end 820, second end 822 and releasable portion 808. FIG. 8B depicts a cross-sectional view of one embodiment of pre-fabricated band 800 taken along line 8B of FIG. 8A.

As shown in FIG. 8B, pre-fabricated band 800 preferably includes pre-fabricated band section 802, adhesive layer 804, release section 806, releasable portion 808 and bond-resistant layer 810. Adhesive layer 804 is disposed over a significant portion of bottom side 812 of pre-fabricated band section 802. Bond-resistant layer 810 is disposed over top side 816 of release section 806. Top side 816 of release section 806 is bonded to bottom side 812 of pre-fabricated band section 802. Release section 806 can be cut to provide releasable portion 808.

Pre-fabricated band 800 can be fabricated prior to the fabrication of band 100. In one embodiment, pre-fabricated band 800 is a typical ID band that does not include any circuitry for carrying information. Pre-fabricated band 800 can be configured with a thermal imaging surface on top side 814 to allow thermal printing on pre-fabricated band section 802. Pre-fabricated band 800 can also be configured in different colors or with areas configured to accept writing or labels.

Method 700 is one example embodiment of a method for manufacturing band 100 using two or more pre-fabricated bands 800. Preferably, the pre-fabricated bands 800 are substantially similar to each other in size and can differ in composition and appearance. For instance, in one embodiment, top band 800 is coated with a thermal imaging surface and bottom band 800 lacks the thermal imaging surface. In another embodiment, each band 800 differs in color and thickness. In one embodiment, bands 800 are not of the same width and length, preferably, however, any mismatch in size does not expose excess adhesive.

Method 700 can be cost effective because it allows the manufacturing of band 100 with the use of existing materials. By using pre-fabricated bands 800, a manufacturer does not need to make significant investments in new capital assets to manufacture band 100 because a substantial amount of the necessary assets and materials are already in place. In fact, a manufacturer can even use existing pre-fabricated bands 800 that are considered excess inventory or outdated.

To manufacture band 100, first release section 806 is removed from bottom side 812 of first pre-fabricated band section 802 at step 702. This exposes first adhesive layer 804. At step 704, circuit 106 is bonded to bottom side 812 of first pre-fabricated band section 802 and, at step 706, top side 814 of second pre-fabricated band section 802 is bonded to bottom side 812 of first pre-fabricated band section 802. Preferably, the bond between first and second pre-fabricated band sections 802 encapsulates the entire circuit 106. At step 708, information is written to circuit 106.

As with the apparatus embodiments, all of the embodiments of methods for manufacturing a band with a circuit described in this specification may use a thermal bond between sections instead of an adhesive layer.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A band for carrying information, comprising:
a first band section comprising a bottom side;
a first bonding layer disposed over a significant portion of the bottom side of the first band section;
a circuit bonded to the bottom side of the first band section, the circuit configured to carry information;
a second band section comprising a top side and a bottom side, the top side bonded to the bottom side of the first band section such that a continuous portion of the first and second band sections are bonded around the entire circuit;
a second adhesive layer disposed over a significant portion of the bottom side of the second band section; and
a release section comprising a top side, the top side bonded to the bottom side of the second band section.

2. The band of claim 1 configured as a bracelet, anklet or necklace.

3. The band of claim 1, wherein the first band section is configured to indicate tampering.

4. The band of claim 1, wherein the first and the second band sections are liquid resistant.

5. The band of claim 1, wherein the second adhesive layer is pressure sensitive.

6. The band of claim 1, wherein the top side of the release section is coated with a bond-resistant layer.

7. The band of claim 1, wherein the release section is cut to provide a releasable portion.

8. The band of claim 7, wherein the releasable portion is configured to expose the second adhesive layer when released.

9. The band of claim 1, wherein the circuit comprises an organic material.

10. The band of claim 1, wherein the circuit comprises an inorganic material.

11. The band of claim 1, wherein the circuit comprises an organic material and an inorganic material.

12. The band of claim 1, wherein the circuit includes a radio frequency (RF) circuit.

13. The band of claim 12, wherein the RF circuit is configured to transmit information.

14. The band of claim 12, wherein the RF circuit is programmable to receive information.

15. The band of claim 1, wherein the first and second band sections are pre-fabricated.

16. The band of claim 1, wherein the first bonding layer includes adhesive.

17. The band of claim 1, wherein the first bonding layer uses thermal bonds.

18. A method for manufacturing a band for carrying information, comprising:
disposing a first layer of adhesive over a significant portion of a bottom side of a first band section;
disposing a second layer of adhesive over a significant portion of a bottom side of a second band section;
bonding a top side of a release section to the bottom side of the second band section;
bonding a circuit, configured to carry information, to the bottom side of the first band section; and
bonding the top side of the second band section to the bottom side of the first band section, wherein the bond between the first and second band sections encapsulates the entire circuit.

19. The method of claim 18, further comprising configuring the first band section to indicate tampering.

20. The method of claim 18, further comprising cutting the release section to provide a releasable portion, the releasable portion configured to expose the second adhesive layer when released.

21. The method of claim 18, further comprising coating the top side of the release section with a bond-resistant layer prior to bonding the release section to the bottom side of the second band section.

22. The method of claim 18, further comprising storing identification information in the circuit.

23. The method of claim 18, wherein the first and second band sections are pre-fabricated.

24. The method of claim 18, wherein the circuit comprises an organic material.

25. The method of claim 18, wherein the circuit comprises an inorganic material.

26. The method of claim 18, wherein the circuit comprises an organic material and an inorganic material.

27. A band for carrying information, manufactured by the method comprising:
- disposing a bonding layer over a significant portion of a bottom side of a first band section;
- disposing an adhesive layer over a significant portion of a bottom side of a second band section;
- bonding a top side of a release section to the bottom side of the second band section;
- bonding a circuit, configured to carry information, to the bottom side of the first band section; and
- bonding the top side of the second band section to the bottom side of the first band section, wherein the bond between the first and second band sections encapsulates the entire circuit.

28. The band of claim 27, wherein the first band section is configured to indicate tampering.

29. The band of claim 27, further comprising cutting the release section to provide a releasable portion, the releasable portion configured to expose the adhesive layer when released.

30. The band of claim 27, further comprising coating the top side of the release section with a bond-resistant layer prior to bonding the release section to the bottom side of the second band section.

31. The band of claim 27, further comprising storing identification information in the circuit.

32. The band of claim 27, wherein the first and second band sections are pre-fabricated.

33. The band of claim 27, wherein the circuit comprises an organic material.

34. The band of claim 27, wherein the circuit comprises an inorganic material.

35. The band of claim 27, wherein the circuit comprises an organic material and an inorganic material.

36. The band of claim 27, wherein the bonding layer includes adhesive.

37. The band of claim 27, wherein the bonding layer uses thermal bonds.

38. A band for carrying information, comprising:
- a bottom side of a first band section bonded to a top side of a second band section;
- a circuit configured to carry information, wherein the circuit is encapsulated between the first and the second band sections;
- a top side of a release section, adhesively coupled to a bottom side of the second band section.

39. The band of claim 38 configured as a bracelet, anklet or necklace.

40. The band of claim 38, wherein the first band section comprises a first end configured to indicate tampering.

41. The band of claim 38, wherein the first and the second band sections are liquid resistant.

42. The band of claim 38, wherein the top side of the release section is coated with a bond-resistant layer.

43. The band of claim 38, wherein the release section is cut to provide a releasable portion.

44. The band of claim 43, wherein the releasable portion is configured to expose an adhesive layer when released.

45. The band of claim 38, wherein the circuit is comprised of organic material.

46. The band of claim 38, wherein the circuit is comprised of inorganic material.

47. The band of claim 38, wherein the circuit is a radio frequency (RF) circuit.

48. The band of claim 47, wherein the RF circuit is configured to transmit information.

49. The band of claim 47, wherein the RF circuit is configured to receive information.

50. The band of claim 38, wherein the first and second band sections are pre-fabricated.

51. The band of claim 38 wherein the bottom side of the first band section is adhesively bonded to the top side of the second band section.

52. The band of claim 38 wherein the bottom side of the first band section is thermally bonded to the top side of the second band section.

53. A method for manufacturing a band for carrying information, comprising:
- removing a first release section from a bottom side of a first pre-fabricated band section to expose a bonding layer;
- bonding a circuit, configured to carry information, to the bottom side of the first pre-fabricated band section;
- bonding a top side of a second pre-fabricated band section to the bottom side of the first pre-fabricated band section, wherein the bond between the first and second pre-fabricated band sections encapsulates the entire circuit.

54. The method of claim 53, wherein the second pre-fabricated band section comprises a release section bonded to a bottom side of the second pre-fabricated band section by an adhesive layer.

55. The method of claim 53, wherein the second release section comprises a releasable portion configured to expose the adhesive layer when released.

56. The method of claim 53, wherein the first and second release sections comprise a bond-resistant layer configured to facilitate release from the pre-fabricated band section.

57. The method of claim 53, further comprising storing information in the circuit.

58. The method of claim 53, wherein the first and second band sections are pre-fabricated.

59. The method of claim 53, wherein the circuit comprises an organic material.

60. The method of claim 53, wherein the circuit comprises an inorganic material.

61. The method of claim 53, wherein the circuit comprises an organic material and an inorganic material.

62. The method of claim 53, wherein the bonding layer includes adhesive.

63. The method of claim 53, wherein the bonding layer uses thermal bonds.

* * * * *